United States Patent
Tsai (10) Patent No.: US 12,393,368 B2
(45) Date of Patent: *Aug. 19, 2025

(54) FLASH MEMORY CONTROLLER AND ASSOCIATED MEMORY DEVICE AND CONTROL METHOD

(71) Applicant: Silicon Motion, Inc., Hsinchu County (TW)

(72) Inventor: Ming-Yu Tsai, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 32 days.

This patent is subject to a terminal disclaimer.

(21) Appl. No.: 18/236,398

(22) Filed: Aug. 21, 2023

(65) Prior Publication Data

US 2024/0184485 A1  Jun. 6, 2024

(30) Foreign Application Priority Data

Dec. 5, 2022  (TW) .................................. 111146505

(51) Int. Cl.
*G06F 3/00*   (2006.01)
*G06F 3/06*   (2006.01)
*G06F 12/00*  (2006.01)

(52) U.S. Cl.
CPC .......... *G06F 3/0659* (2013.01); *G06F 3/0619* (2013.01); *G06F 3/0656* (2013.01); *G06F 3/0679* (2013.01)

(58) Field of Classification Search
CPC .... G06F 3/0659; G06F 3/0619; G06F 3/0679; G06F 3/0656

(Continued)

(56) References Cited

U.S. PATENT DOCUMENTS 7,274,781 B2 * 9/2007 Lipton .................. H04M 15/06
                                                    379/142.01
7,739,475 B2 * 6/2010 He ....................... G06F 12/0804
                                                    711/203

(Continued)

FOREIGN PATENT DOCUMENTS

CN   112506569 A    3/2021
EP   2 311 039 B1   5/2013

(Continued)

OTHER PUBLICATIONS

Tsai, the specification, including the claims, and drawings in the U.S. Appl. No. 18/233,897, filed Aug. 15, 2023.

*Primary Examiner* — Sheng Jen Tsai
(74) *Attorney, Agent, or Firm* — Winston Hsu (57) ABSTRACT

A flash memory controller is arranged to access a flash memory module, and includes a transmission interface circuit a buffer memory, and a microprocessor. The transmission interface circuit is coupled to a host device, wherein the transmission interface circuit includes a command processing circuit, and the command processing circuit is arranged to: receive a command from the host device; utilize multiple check items to check the command to generate at least one check result; and convert the command to generate a converted command of a specific format, wherein the converted command comprises an error state field for recording the at least one check result. The buffer memory is arranged to store the converted command. The microprocessor is arranged to read the converted command from the buffer memory, and access the flash memory module according to the converted command.

19 Claims, 6 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 10,497,075 B2* | 12/2019 | Chiappe | ................. | G06Q 10/10 |
| 11,630,721 B2* | 4/2023 | Kim | ................... | G06F 11/1004 |
| | | | | 365/185.09 |
| 11,720,490 B2* | 8/2023 | Chen | .................... | G06F 3/0659 |
| | | | | 711/154 |
| 11,816,028 B2* | 11/2023 | Huo | .................... | G06F 12/0246 |
| 12,026,101 B2* | 7/2024 | Park | ................... | G06F 12/0862 |
| 2009/0307537 A1* | 12/2009 | Chen | .................. | G06F 11/1068 |
| | | | | 714/E11.054 |
| 2011/0029732 A1* | 2/2011 | Kobayashi | ............. | G06F 3/061 |
| | | | | 711/E12.001 |
| 2012/0051643 A1* | 3/2012 | Ha | .......................... | B61L 25/04 |
| | | | | 382/182 |
| 2016/0036466 A1* | 2/2016 | DeBrosse | ........... | G06F 11/1048 |
| | | | | 714/764 |
| 2016/0036888 A1 | 2/2016 | Jadhav | | |
| 2016/0098316 A1* | 4/2016 | Lin | ........................ | G11C 29/42 |
| | | | | 714/764 |
| 2018/0018172 A1* | 1/2018 | Rouban | ............... | G06F 9/30109 |
| 2018/0253345 A1* | 9/2018 | Kim | ...................... | G06F 11/073 |
| 2021/0034536 A1* | 2/2021 | Kim | ..................... | G06F 13/1673 |
| 2021/0149796 A1* | 5/2021 | Nam | .................... | G06F 13/1668 |
| 2021/0224145 A1* | 7/2021 | Warmack | ........... | G06F 9/44505 |
| 2024/0134740 A1* | 4/2024 | Rapalli | ............... | G06F 11/1004 |
| 2024/0184484 A1* | 6/2024 | Tsai | ..................... | G06F 3/0607 |

FOREIGN PATENT DOCUMENTS

| | | |
|---|---|---|
| TW | 200739547 | 10/2007 |
| TW | 200839754 | 10/2008 |
| TW | 201433919 A | 9/2014 |
| TW | 1660271 B | 5/2019 |
| TW | 202230114 A | 8/2022 |

* cited by examiner

| Bit / Byte | 7 | 6 | 5 | 4 | 3 | 2 | 1 | 0 |
|---|---|---|---|---|---|---|---|---|
| B0 | Operation code | | | | | | | |
| B1 | Remain | | | | | | | |
| B2 | LBA | | | | | | | |
| B3 | | | | | | | | |
| B4 | Transfer length | | | | | | | |
| B5 | Control code | | | | | | | |

FIG. 3

| Bit\Byte | 7 | 6 | 5 | 4 | 3 | 2 | 1 | 0 |
|---|---|---|---|---|---|---|---|---|
| B0 | Operation code | | | | | | | |
| B1 | RDPROTECT | | | DPO | FUA | Remain | FUA_NV | Obsolete |
| B2 | LBA | | | | | | | |
| B3 | | | | | | | | |
| B4 | | | | | | | | |
| B5 | | | | | | | | |
| B6 | Remain | | | | Group number | | | |
| B7 | Transfer length | | | | | | | |
| B8 | | | | | | | | |
| B9 | Control code | | | | | | | |

| Bit / Byte | 7 | 6 | 5 | 4 | 3 | 2 | 1 | 0 |
|---|---|---|---|---|---|---|---|---|
| B0 | \multicolumn{8}{c|}{Operation code} |
| B1 | \multicolumn{3}{c|}{RDPROTECT} | DPO | FUA | Remain | FUA_NV | Remain |
| B2 | \multicolumn{8}{c|}{LBA} |
| ... | | | | | | | | |
| B9 | | | | | | | | |
| B10 | \multicolumn{8}{c|}{Transfer length} |
| ... | | | | | | | | |
| B13 | | | | | | | | |
| B14 | Remain | \multicolumn{7}{c|}{Group number} |
| B15 | \multicolumn{8}{c|}{Control code} |

|    | B7 | B6 | B5 | B4 | B3 | B2 | B1 | B0 |
|----|----|----|----|----|----|----|----|----|
| D0 | Command set type | Memory slot index value | Group number | Response setting | Read/write identification | Operation code | Label | LUN |
| D1 | LBA | | | | | | | |
| D2 | Remain | | | | | | | |
| D3 | Residual transfer count | | | | Remain | Overflow/ underflow label | Transfer length | Error state |

FIG. 6

FLASH MEMORY CONTROLLER AND ASSOCIATED MEMORY DEVICE AND CONTROL METHOD

BACKGROUND OF THE INVENTION

1. Field of the Invention

The present invention is related to a flash memory controller, and more particularly, to a flash memory controller including a transmission interface circuit, wherein after the transmission interface circuit receives a command from a host device, the transmission interface circuit converts the command into a converted command of a fixed format, so that subsequent processing of firmware can be performed quickly and efficiently.

2. Description of the Prior Art

For a conventional flash memory controller conforming to a universal flash storage (UFS) specification, when a command (e.g. a read command or a write command) is received from a host device, the flash memory controller is required to perform a series of error checks upon the command through firmware therein, to determine whether there are any errors in the command for subsequent processing. Specifically, each command is required to go through more than a dozen error checks before it can be determined whether the command does not have any errors, and the command can only be processed in a next step when it does not have any errors. Since the read command and the write command have many different formats, the firmware will be required to identify or process the read command and the write command of different formats. In addition, since each command is required to go through many checks, if the flash memory controller receives a large number of commands from the host device in a short period of time, it will take a lot of time to identify and perform error checks upon these commands, which reduces the overall performance.

SUMMARY OF THE INVENTION

It is therefore one of the objectives of the present invention to provide a flash memory controller, wherein after a transmission interface circuit in the flash memory controller receives a command from a host device, the transmission interface circuit converts the command into a converted command of a fixed format, so that subsequent processing of firmware can be performed quickly and efficiently.

According to an embodiment of the present invention, a flash memory controller is provided, wherein the flash memory controller is arranged to access a flash memory module, and the flash memory controller comprises a transmission interface circuit, a buffer memory, and a microprocessor. The transmission interface circuit is coupled to a host device, wherein the transmission interface circuit comprises a command processing circuit, and the command processing circuit is arranged to: receive a command from the host device; utilize multiple check items to check the command to generate at least one check result; and convert the command to generate a converted command of a specific format, wherein the converted command comprises an error state field for recording the at least one check result. The buffer memory is arranged to store the converted command. The microprocessor is arranged to read the converted command from the buffer memory, and access the flash memory module according to the converted command.

According to an embodiment of the present invention, a memory device is provided, wherein the memory device comprises a flash memory module and a flash memory controller, and the flash memory controller comprises a transmission interface circuit, a buffer memory, and a microprocessor. The transmission interface circuit is coupled to a host device, wherein the transmission interface circuit comprises a command processing circuit, and the command processing circuit is arranged to: receive a command from the host device; utilize multiple check items to check the command to generate at least one check result; and convert the command to generate a converted command of a specific format, wherein the converted command comprises an error state field for recording the at least one check result. The buffer memory is arranged to store the converted command. The microprocessor is arranged to read the converted command from the buffer memory, and access the flash memory module according to the converted command.

According to an embodiment of the present invention, a control method of a flash memory controller is provided. The control method comprises: receiving a command from a host device; utilizing multiple check items to check the command to generate at least one check result, and converting the command to generate a converted command of a specific format, wherein the converted command comprises an error state field for recording the at least one check result; storing the converted command in a buffer memory; and reading the converted command from the buffer memory, and accessing the flash memory module according to the converted command.

One of the benefits of the present invention is that, by converting a read/write command from the host device into a converted command of a specific format, the microprocessor can perform subsequent processing more efficiently. In addition, since the command processing circuit will convert each read/write command from the host device to generate the converted command, when the host device is required to perform a large number of read/write commands upon the memory device, the large number of read/write commands can be quickly converted and checked for errors to generate multiple converted commands as the command processing circuit is implemented by hardware. This enables the microprocessor to execute the large number of read/write commands quickly and efficiently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
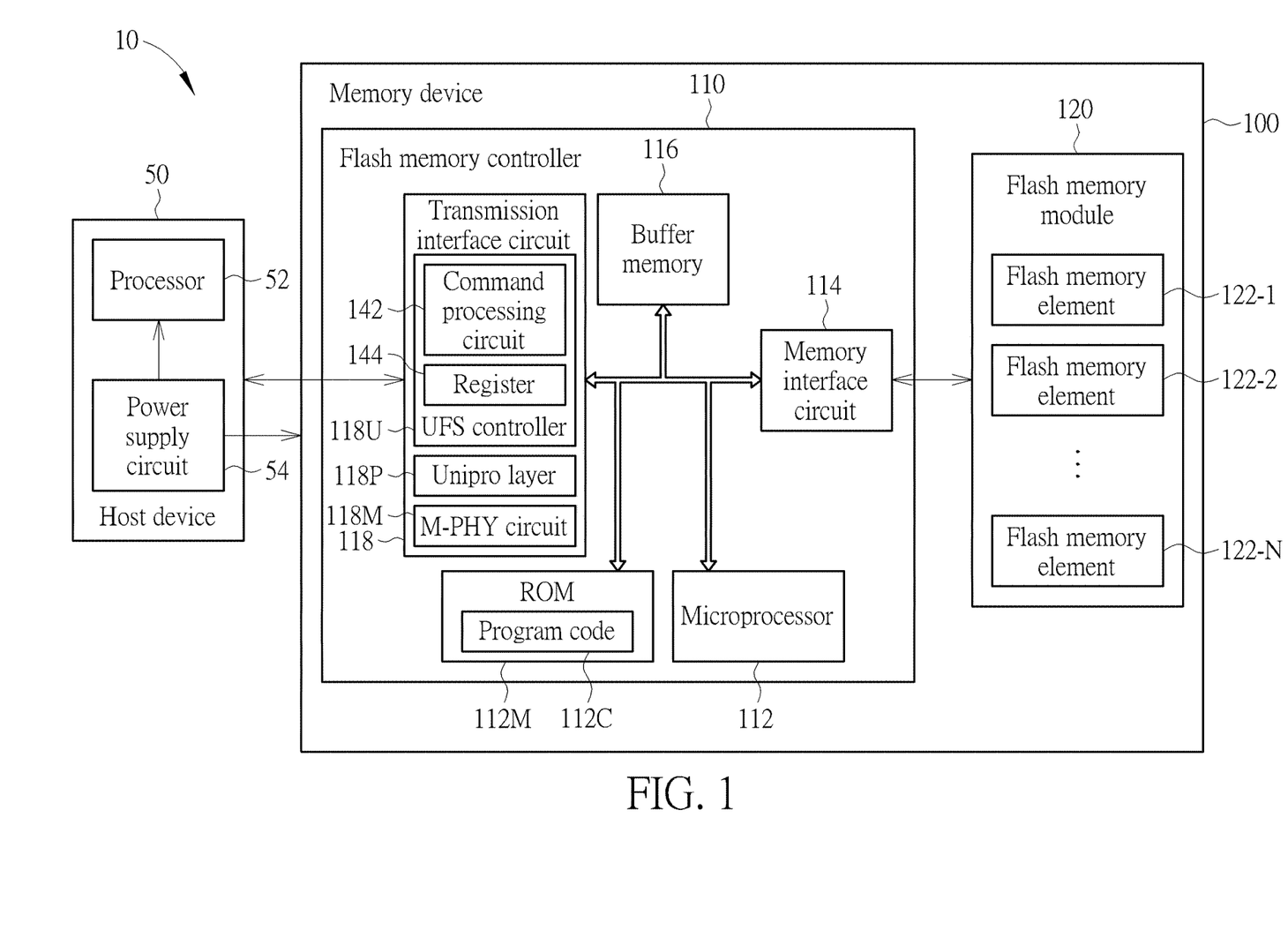
FIG. 1 is a diagram illustrating an electronic device according to an embodiment of the present invention.

FIG. 1 is a diagram illustrating an electronic device 10 according to an embodiment of the present invention, wherein the electronic device 10 may include a host device 50 and a memory device 100. The host device 50 may include at least one processor 52 and a power supply circuit 52 coupled to the processor 52. The processor 52 is arranged to control operations of the host device 50. The power supply circuit 52 is arranged to supply power to the processor 52 and the memory device 100, and output one or more driving voltages to the memory device 100. The memory device 100 may be arranged to provide storage space to the host device 50, and obtain the one or more driving voltages from the host device 50 as a power supply of the memory device 100. The host device 50 may be a multifunctional mobile phone, a wearable device, a tablet, a personal computer or other electronic product. The memory device 100 may be an embedded storage device, such as an embedded storage device conforming to the UFS specification. In this embodiment, the memory device 100 may include a flash memory controller 110 and a flash memory module 120, wherein the flash memory controller 110 is arranged to control operations of the memory device 100 and access the flash memory module 120, and the flash memory module 120 is arranged to store information. The flash memory module 120 may include at least one flash memory element (e.g. one or more flash memory chips or one more flash memory dies), such as multiple flash memory elements 122-1, 122-2, . . . , 122-N, wherein N is a positive integer greater than 1.

As shown in FIG. 1, the flash memory controller 110 may include a microprocessor 112, a read-only memory (ROM) 112M, a memory interface circuit 114, a buffer memory 116, and a transmission interface circuit 118, wherein the above components can be coupled to each other through a bus. The buffer memory 116 is implemented by a static random access memory (SRAM), and may be arranged to provide internal storage space to the memory controller 110. The ROM 112M is arranged to store a program code 112C. The microprocessor 112 is arranged to execute the program code 112C to control access of the flash memory module 120. It should be noted that, in some embodiments, the program code 112C may be stored in the buffer memory 116 or any other type of memory. In addition, the memory interface circuit 114 may include an encoder and a decoder for encoding data written into the flash memory module 120 and decoding data read from the flash memory module 120. The transmission interface circuit 118 may conform to a specific communications specification (e.g. the UFS specification), and may perform communications between the memory device 100 and the host device 50. The transmission interface circuit 118 may include a UFS controller 118U, an M-PHY circuit 118M conforming to specifications related to the MIPI Alliance, and a unified protocol (UniPro) layer 118P, wherein the above components can interact with each other, and the UFS controller 118U at least includes a command processing circuit 142 and a register 144.

In this embodiment, the host device 50 may transmit multiple commands to the flash memory controller 110, and the flash memory controller 110 may read data from the flash memory module 120 or write data into the flash memory module 120 according to the commands from the host device 50.

Figure 2:
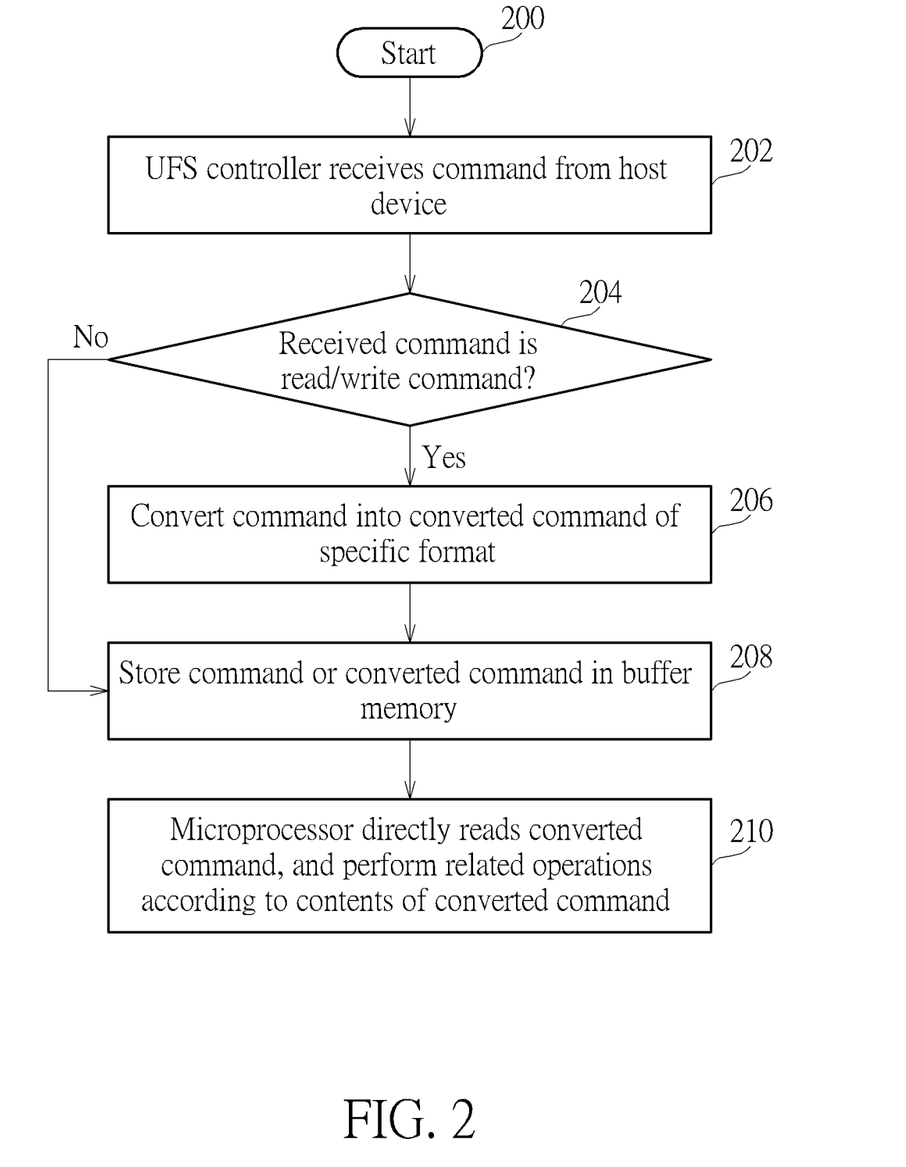
FIG. 2 is a flow chart of a control method of a flash memory controller according to an embodiment of the present invention.

FIG. 2 is a flow chart of a control method of the flash memory controller 110 shown in FIG. 1 according to an embodiment of the present invention.

In Step 200, the flow starts, the memory device 100 is powered on, and an initialization operation is completed.

In Step 202, the UFS controller 118U of the flash memory controller 110 receives a command from the host device 50.

In Step 204, the command processing circuit 142 of the UFS controller 118U determines whether the command is a read command or a write command. If Yes, Step 206 is entered; if No, Step 208 is entered and the command is stored in the buffer memory 116.

In Step 206, the command processing circuit 142 converts the command to generate a converted command of a specific format.

Figure 3:
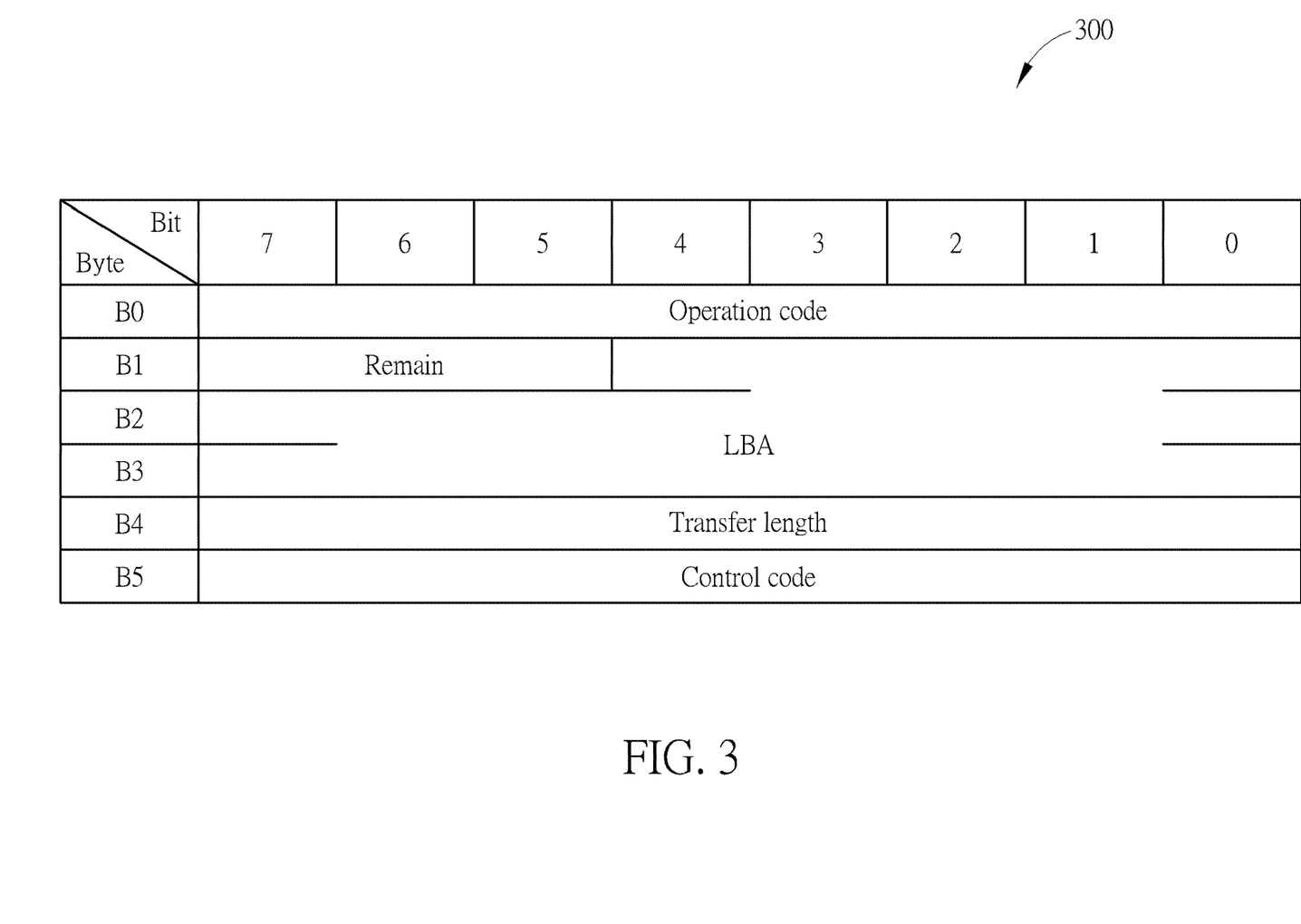
FIG. 3 is a diagram illustrating a read command of a first format.

Specifically, the read command transmitted from the host device 50 to the flash memory controller 110 may have different formats, such as READ(6), READ(10), and READ(16) described in the UFS specification. FIG. 3 is a diagram illustrating a read command 300 of a first format, wherein the read command 300 corresponds to READ(6) described in the UFS specification. As shown in FIG. 3, the read command 300 includes 6 bytes, wherein byte B0 stores an operation code, bytes B1-B3 include a logical block address (LBA) and a remain field, byte B4 includes a transfer length, and byte B5 includes a control code.

Figure 4:
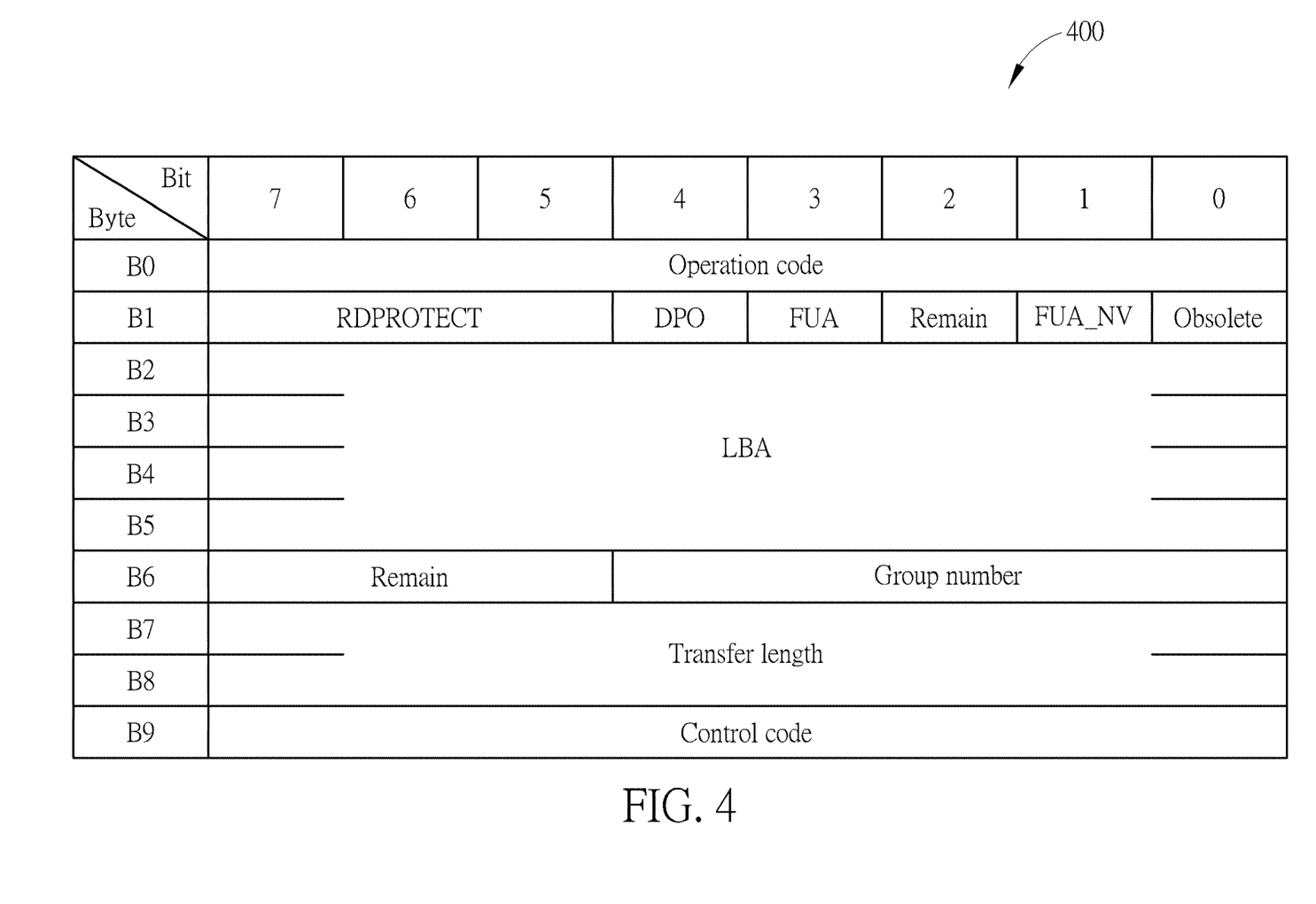
FIG. 4 is a diagram illustrating a read command of a second format.

FIG. 4 is a diagram illustrating a read command 400 of a second format, wherein the read command 400 corresponds to READ(10) described in the UFS specification. As shown in FIG. 4, the read command 400 includes 10 bytes, wherein byte B0 stores an operation code, byte B1 stores parameters including "RDPROTECT", disable page out (DPO), force unit access (FUA), a remain field, "FUA_NV", and "Obsolete", bytes B2-B5 include an LBA, byte B6 includes a remain field and a group number, bytes B7-B8 include a transfer length, and byte B9 includes a control code.

Figure 5:
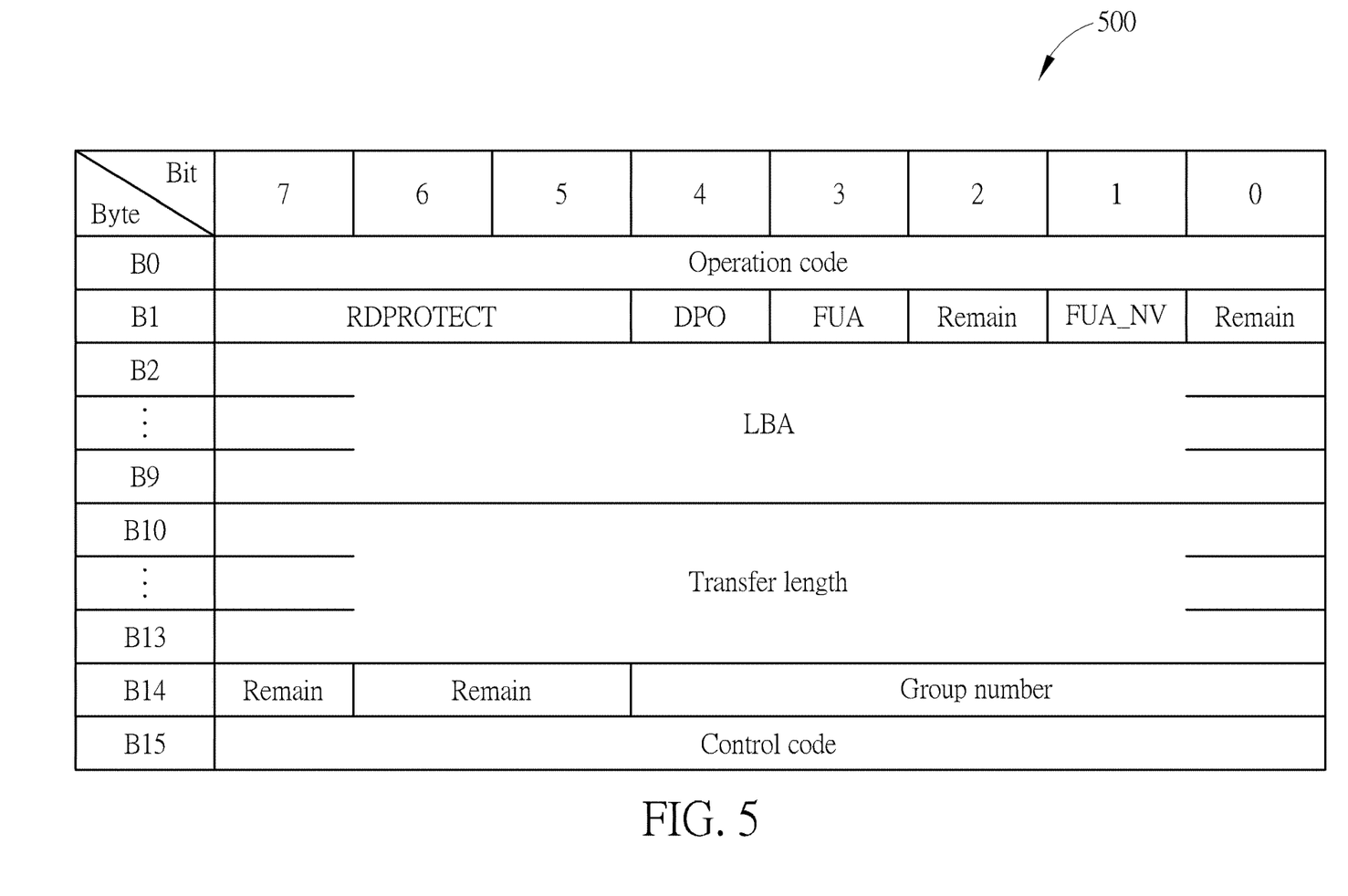
FIG. 5 is a diagram illustrating a read command of a third format.

FIG. 5 is a diagram illustrating a read command 500 of a third format, wherein the read command 500 corresponds to READ(16) described in the UFS specification. As shown in FIG. 5, the read command 500 includes 16 bytes, wherein byte B0 stores an operation code, byte B1 stores parameters including "RDPROTECT", DPO, FUA, a remain field, and "FUA_NV", bytes B2-B9 include an LBA, bytes B10-B13 include a transfer length, byte B14 includes a remain field and a group number, and byte B15 includes a control code.

It should be noted that, since contents of each field in the read commands 300, 400, and 500 are well known in the UFS specification, details are omitted here for brevity. In addition, the formats of the read commands 300, 400, and 500 are for illustration only, and the present invention is not limited thereto. In some embodiments, the read command allowed to be received by the flash memory controller 110 may have other format differences. For example, the read command may have different bytes, different LBA lengths, different transfer lengths (e.g. the maximum allowed transfer length, i.e., the maximum amount of data allowed to be read), or different numbers of fields. These design changes all belong to the scope of the present invention.

Similarly, the write command transmitted from the host device 50 to the flash memory controller 110 may have different formats, such as WRITE(6), WRITE(10), and WRITE(16) described in the UFS specification. Since these write commands of different formats are well known in the UFS specification, details are omitted here for brevity. In addition, the formats of these write commands are for illustration only, and the present invention is not limited thereto. In some embodiments, the write command allowed to be received by the flash memory controller 110 may have other format differences. For example, the write command may have different bytes, different LBA lengths, different transfer lengths (e.g. the maximum allowed transfer length, i.e., the maximum amount of data allowed to be written), or different numbers of fields. These design changes all belong to the scope of the present invention.

Figure 6:
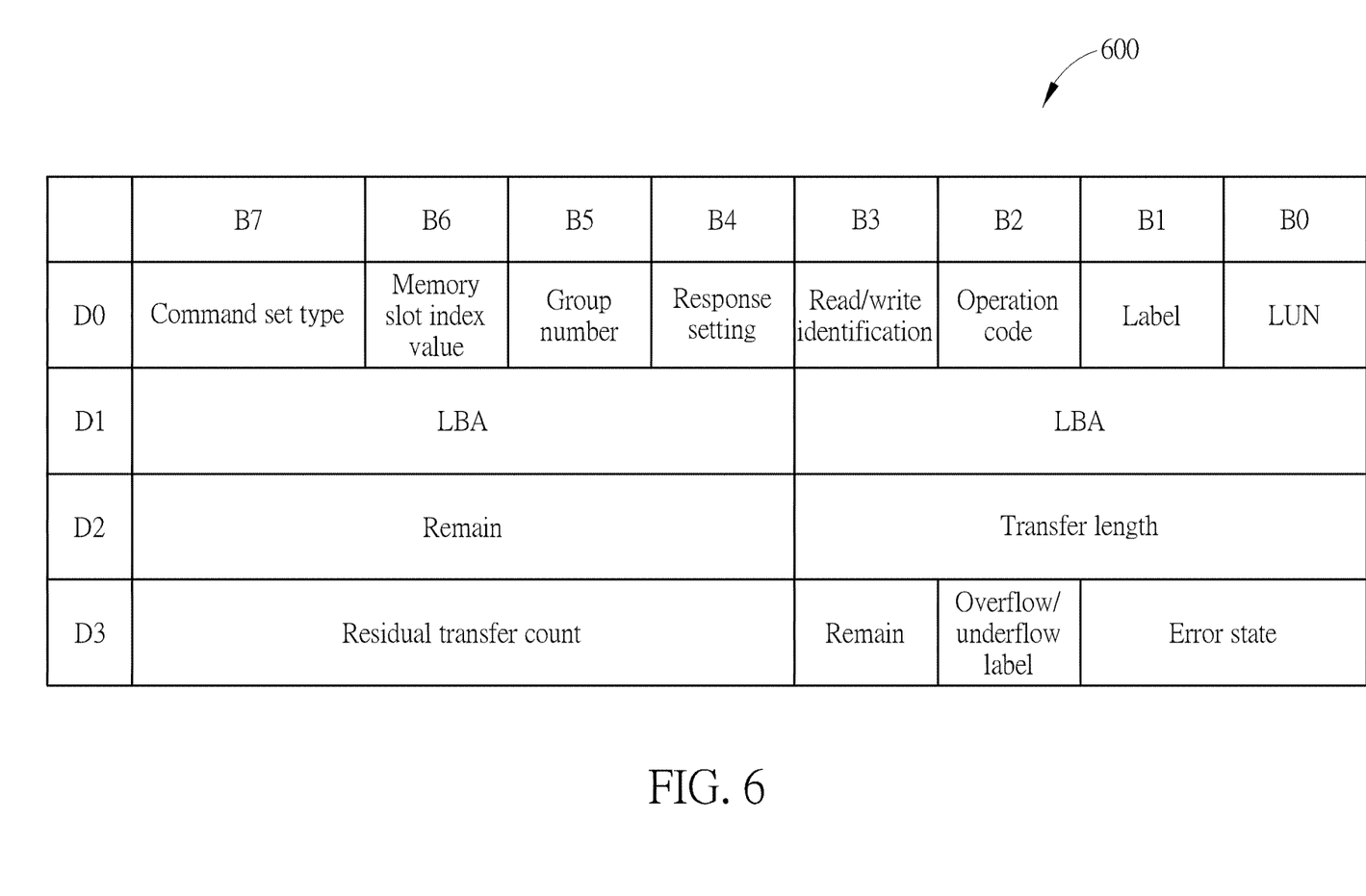
FIG. 6 is a diagram illustrating a converted command of a specific format generated by converting a read command or a write command through a command processing circuit according to an embodiment of the present invention.

FIG. 6 is a diagram illustrating a converted command 600 of a specific format generated by converting a read command or a write command through the command processing circuit 142 according to an embodiment of the present invention. In this embodiment, the converted command 600 may include 4 codewords D0-D3, and each codeword D0-D3 includes 8 bytes B0-B7, but the present invention is not limited thereto. As shown in FIG. 6, in the codeword D0 of the converted command 600, the byte B0 includes a logical unit number (LUN) of the converted command 600; the byte B1 includes a label for indicating that the converted command 600 is a read command or a write command; the byte B2 includes an operation code for indicating which format of the write/read command the converted command 600 belongs to before conversion (e.g. in this embodiment, the operation code may be arranged to indicate which of READ(6), READ(10), READ(16), WRITE(6), WRITE(10), and WRITE(16) the converted command 600 belongs to before conversion); byte B3 is a read/write identification code, wherein contents of the read/write identification code are the same as that of the byte B1, i.e., the read/write identification code records the converted command 600 as the read command or the write command for internal circuits; byte B4 is a response setting for setting a condition under which a response message is sent to the host device 50 to notify that the command is successfully received (e.g. the response setting may set that, when the flash memory controller 110 receives a command from the host device 50 and the command is stored in the buffer memory 16, the response message is sent to the host device 50 to notify that the command is successfully received; or the response setting may set that, after the flash memory controller 110 successfully accesses the flash memory module 120 according to a command from the host device 50, the response message is sent to the host device 50 to notify that the command is successfully received); byte B5 includes a group number for setting a read/write attribute (e.g. the read/write operation is performed by a single-level cell (SLC) method, a multi-level cell (MLC) method, or a triple-level cell (TLC) method); byte B6 is a memory slot index value, i.e., an address of the converted command 600 within the buffer memory 116; and byte B7 is a command set type.

In the codeword D1 of the converted command 600, bytes B0-B7 may be arranged to store an LBA, wherein if the amount of data required to be written by the write command or the amount of data required to be read by the read command is low, it is possible to only utilize bytes B0-B3 to record the LBA.

In the codeword D2 of the converted command 600, bytes B0-B3 are arranged to indicate a transfer length, i.e., the amount of data required to be written by the write command or the amount of data required to be read by the read command.

In the codeword D3 of the converted command 600, bytes B0 and B1 are arranged to record whether there is an error in the converted command 600 before conversion (i.e. an error state); byte B2 is an overflow/underflow label; byte B3 is a remain field; and bytes B4-B7 are a residual transfer count, wherein contents of the overflow/underflow label and contents of the residual transfer count are well known in the UFS specification, and details are omitted here for brevity.

It should be noted that a part of contents of the converted command 600 can be directly generated by the original read/write command. For example, the LBA and the transfer length of the converted command 600 can be generated according to the LBA and the transfer length of the read commands 300, 400, and 500. In addition, another part of contents of the converted command 600 can be generated by parsing the original read/write command or through some current settings and a current state of the memory device 100, such as the memory slot index value, the overflow/underflow label, the residual transfer count, or the error state.

In this embodiment, no matter whether the command received by the UFS controller 118U is a read command or a write command, no matter which format of a read command is received by the UFS controller 118U, and no matter which format of a write command is received by the UFS controller 118U, the command processing circuit 142 can convert the read/write command from the host device 50 into the converted command of the specific format.

It should be noted that the converted command 600 shown in FIG. 6 is for illustration only, and is not meant to be a limitation of the present invention. In some embodiments, as long as the converted command 600 includes the LUN, the label, the LBA, the transfer length, and the error state, and each of the LUN, the label, the LBA, the transfer length, and the error state is located in a fixed address in the converted command 600, respectively, the converted command 600 may have different field contents.

In addition, in Step 206, the command processing circuit 142 may be further arranged to check the received command to determine whether the received d conforms to the specification. Specifically, assume that the received command from the host device 50 is a read command or a write command, and the command processing circuit 142 may check the received command to determine whether there is an error in the received command. For example, the command processing circuit 142 may determine whether the LUN in the received command exceeds the maximum LUN of the memory device 100. If Yes (i.e. the LUN in the received command exceeds the maximum LUN of the memory device 100), it is determined that there is an error in the received command. The command processing circuit 142 may determine whether the LUN in the received command has been set by the memory device 100. If No (i.e. the LUN in the received command has not been set by the memory device 100), it is determined that there is an error in the received command. The command processing circuit 142 may determine whether the LUN in the received command has been disabled by the memory device 100. If Yes (i.e. the LUN in the received command has been disabled by the memory device 100), it is determined that there is an error in the received command. The command processing circuit 142 may determine whether the LBA length in the received command exceeds the LBA length allowed by the flash memory controller 110. If Yes (i.e. the LBA length in the received command exceeds the LBA length allowed by the flash memory controller 110), it is determined that there is an error in the received command. The command processing circuit 142 may determine whether the transfer length in the received command exceeds the transfer length allowed by the flash memory controller 110. If Yes (i.e. the transfer length in the received command exceeds the transfer length allowed by the flash memory controller 110), it is determined that there is an error in the received command.

After checking the received command, the command processing circuit 142 can record the error state in the bytes B0 and B1 of the codeword D3 within the converted command 600.

In one embodiment, multiple check items may be set in the register 144, and the command processing circuit 142 may read contents of the check items from the register 144 to check the received command. In one embodiment, the register 144 stores 16 check items, 16 bits included in the bytes B0 and B1 of the codeword D3 within the converted command 600 correspond to the 16 check items, respectively, and a bit value (e.g. "0" or "1") of each bit may be arranged to indicate whether a corresponding check item is passed (i.e. indicate whether the received command passes the corresponding check item). For example, a first bit of the bytes B0 and B1 being "1" represents that a first check item is not passed, the first bit of the bytes B0 and B1 being "0" represents that the first check item is passed; a second bit of the bytes B0 and B1 being "1" represents that a second check item is not passed, the second bit of the bytes B0 and B1 being "0" represents that the second check item is passed, and so on.

It should be noted that, in this embodiment, operations in Step 204 and Step 206 are implemented by a hardware circuit in the transmission interface circuit 118, and do not involve any firmware operations. That is, the microprocessor 112 will not execute the program code 112C to check or perform a format conversion upon the command from the host device 50.

In Step 208, the command processing circuit 142 stores the converted command 600 in the buffer memory 116, and also stores the read/write command before conversion in the buffer memory 116. Specifically, if the command processing circuit 142 converts the read command 400 of the format READ(10) shown in FIG. 4 to generate the converted command 600, the read command 400 and the converted command 600 will be stored in the buffer memory 116 at a same time.

In Step 210, after the converted command 600 is successfully stored in the buffer memory 116, the microprocessor 112 may know that there is a command from the host device 50 via a specific mechanism. For example, the UFS controller 118U may further include multiple registers for indicating whether a command that has not yet been executed from the host device 50 is received and an address within the buffer memory 116 where the command that has not yet been executed is stored. The microprocessor 112 may periodically read the registers to determine whether there is a need to read the command from the buffer memory 116 and execute the command, but the present invention is not limited thereto. Afterwards, the microprocessor 112 directly reads the converted command 600 from the buffer memory 116 without reading the read/write command before conversion, and performs related operations according to contents of the converted command 600. Specifically, if the error state in the converted command 600 indicates that there is no error in the read/write command, the microprocessor 112 may write data into the flash memory module 120 or read data from the flash memory module 120 according to the LBA, the transfer length, and other information in the converted command 600. If the error state in the converted command 600 indicates that there is an error in the read/write command, the microprocessor 112 may generate and transmit a response signal to the host device 50 according to the error state in the converted command 600, to notify the host device 50 that there is an error in the command and the command cannot be executed successfully. In one embodiment, since the error state in the converted command 600 indicates which check item has an error, the microprocessor 112 may directly generate the response signal to the host device 50 according to the error state in the converted command 600, to notify the host device 50 which check item the command does not meet.

As mentioned above, since the converted command 600 has a fixed format and an error state field, the microprocessor 112 is not required to determine the format of the converted command 600, and is not required to check whether there is an error in the read/write command from the host device 50, so that the processing speed of the command can be effectively accelerated.

After the converted command 600 is executed, the converted command 600 and the command before conversion (e.g. the read command 400 mentioned in Step 208) may be allowed to be removed from the buffer memory 116.

In one embodiment, since the converted command 600 and the read/write command before conversion (e.g. the read command 400) will be stored in the buffer memory 116, the UFS controller 118U and the microprocessor 112 may select to process the converted command 600 or the read command 400. That is, under a first mode, the microprocessor 112 will only read the converted command 600 from the buffer memory 116 without executing the read command 400. Under a second mode, the microprocessor 112 will only read the original read/write command (e.g. the read command 400) from the buffer memory 116, and the command processing circuit 142 can be turned off to stop generating the converted command 600 at this moment.

In summary, in the flash memory controller 110 of the present invention, by converting a read/write command from the host device 50 into a converted command of a specific format, the microprocessor 112 can perform subsequent processing more efficiently. In addition, since the command processing circuit 142 will convert each read/write command from the host device 50 to generate the converted command 600, when the host device 50 is required to perform a large number of read/write commands upon the memory device 100, the large number of read/write commands can be quickly converted and checked for errors to generate multiple converted commands as the command processing circuit 142 is implemented by hardware. This enables the microprocessor 112 to execute the large number of read/write commands quickly and efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, arranged to access a flash memory module, comprising:
   a transmission interface circuit, coupled to a host device, wherein the transmission interface circuit comprises a command processing circuit, and the command processing circuit is arranged to:
   receive a command from the host device;
   utilize multiple check items to check the command to generate at least one check result; and
   convert the command to generate a converted command of a specific format, wherein the converted command comprises an error state field for recording the at least one check result;
   a buffer memory, arranged to store the converted command; and a microprocessor, arranged to read the converted command from the buffer memory, and access the flash memory module according to the converted command;
wherein the converted command further comprises a logical unit number (LUN), a logical block address (LBA), and a transfer length;
wherein the converted command further comprises an operation code, and the operation code is arranged to indicate whether the command corresponding to the converted command is a read command of a first format, a read command of a second format, a write command of the first format, or a write command of the second format.

2. The flash memory controller of claim 1, wherein in response to the at least one check result of the converted command indicating there is an error in the command, the microprocessor generates a response signal to the host device according to an error state of the at least one check result in the converted command.

3. The flash memory controller of claim 1, wherein the at least one check result is multiple check results, the multiple check results correspond to the multiple check items, respectively, and each of the multiple check results indicates whether the command conforms to a corresponding check item.

4. The flash memory controller of claim 1, wherein the converted command further comprises a label, and the label is arranged to indicate whether the converted command is a read command or a write command.

5. The flash memory controller of claim 1, wherein the converted command further comprises a response setting, and the response setting is arranged to set that, in response to the command being stored in the buffer memory or the microprocessor successfully accessing the flash memory module according to the converted command, a response message is sent to the host device to notify that the command is received successfully.

6. The flash memory controller of claim 1, wherein the converted command further comprises a group number, and the group number is arranged to set that a single-level cell (SLC) method, a multi-level cell (MLC) method, or a triple-level cell (TLC) method is utilized to perform a read/write operation upon the flash memory module.

7. The flash memory controller of claim 1, wherein the converted command further comprises a memory slot index value, and the memory slot index value is arranged to indicate an address of the converted command within the buffer memory.

8. The flash memory controller of claim 1, wherein operations of the command processing circuit are implemented by a hardware circuit, and generating the converted command of the specific format by converting the command through the command processing circuit does not involve operations of the microprocessor.

9. A memory device, comprising:
a flash memory module; and
a flash memory controller, arranged to access the flash memory module, comprising:
  a transmission interface circuit, coupled to a host device, wherein the transmission interface circuit comprises a command processing circuit, and the command processing circuit is arranged to:
    receive a command from the host device;
    utilize multiple check items to check the command to generate at least one check result; and
    convert the command to generate a converted command of a specific format, wherein the converted command comprises an error state field for recording the at least one check result;
  a buffer memory, arranged to store the converted command; and
  a microprocessor, arranged to read the converted command from the buffer memory, and access the flash memory module according to the converted command;
wherein the converted command further comprises a logical unit number (LUN), a logical block address (LBA), and a transfer length;
wherein the converted command further comprises an operation code, and the operation code is arranged to indicate whether the command corresponding to the converted command is a read command of a first format, a read command of a second format, a write command of the first format, or a write command of the second format.

10. A control method of a flash memory controller comprising:
receiving a command from a host device;
utilizing multiple check items to check the command to generate at least one check result, and converting the command to generate a converted command of a specific format, wherein the converted command comprises an error state field for recording the at least one check result;
storing the converted command in a buffer memory; and
reading the converted command from the buffer memory, and accessing the flash memory module according to the converted command;
wherein the converted command further comprises a logical unit number (LUN), a logical block address (LBA), and a transfer length;
wherein the converted command further comprises an operation code, and the operation code is arranged to indicate whether the command corresponding to the converted command is a read command of a first format, a read command of a second format, a write command of the first format, or a write command of the second format.

11. The control method of claim 10, further comprising:
in response to the at least one check result of the converted command indicating there is an error in the command, generating a response signal to the host device according to an error state of the at least one check result in the converted command.

12. The control method of claim 10, wherein the at least one check result is multiple check results, the multiple check results correspond to the multiple check items, respectively, and each of the multiple check results indicates whether the command conforms to a corresponding check item.

13. The control method of claim 10, wherein the converted command further comprises a label, and the label is arranged to indicate whether the converted command is a read command or a write command.

14. The control method of claim 10, wherein the converted command further comprises a response setting, and the response setting is arranged to set that, in response to the command being stored in the buffer memory or the microprocessor successfully accessing the flash memory module according to the converted command, a response message is sent to the host device to notify that the command is received successfully.

15. The control method of claim 10, wherein the converted command further comprises a group number, and the group number is arranged to set that a single-level cell (SLC)

method, a multi-level cell (MLC) method, or a triple-level cell (TLC) method is utilized to perform a read/write operation upon the flash memory module.

16. The control method of claim 10, wherein the converted command further comprises a memory slot index value, and the memory slot index value is arranged to indicate an address of the converted command within the buffer memory.

17. The flash memory controller of claim 1, wherein both the command and the converted command are stored in the buffer memory, and the flash memory controller selectively operates in a first mode and a second mode; and under the first mode, the microprocessor only reads the converted command from the buffer memory without executing the command; and under the second mode, the microprocessor only reads the command from the buffer memory.

18. The memory device of claim 9, wherein both the command and the converted command are stored in the buffer memory, and the flash memory controller selectively operates in a first mode and a second mode; and under the first mode, the microprocessor only reads the converted command from the buffer memory without executing the command; and under the second mode, the microprocessor only reads the command from the buffer memory.

19. The control method of claim 10, wherein both the command and the converted command are stored in the buffer memory, and the control method further comprises:

selectively operating in a first mode and a second mode;

under the first mode, only reading the converted command from the buffer memory without executing the command; and under the second mode, only reading the command from the buffer memory.

* * * * *